No. 704,327. Patented July 8, 1902.
G. HECK.
VEHICLE AXLE.
(Application filed Feb. 18, 1902.)
(No Model.)
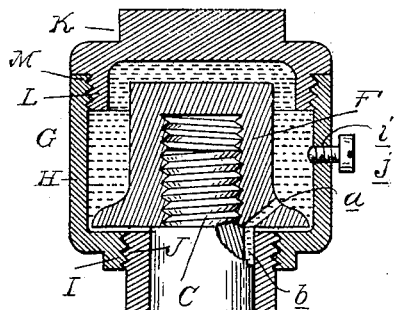
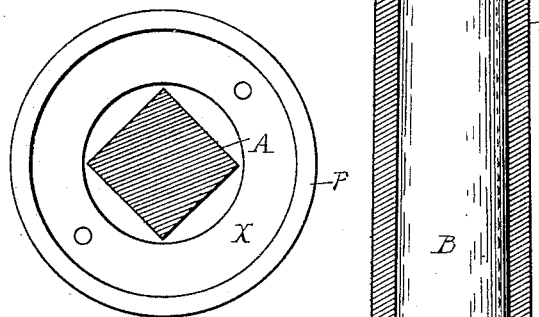
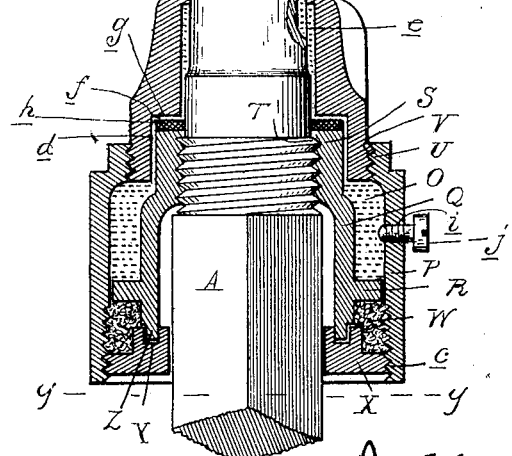
Witnesses
Inventor
Gustav Heck

UNITED STATES PATENT OFFICE.

GUSTAV HECK, OF DETROIT, MICHIGAN, ASSIGNOR OF ONE-HALF TO RUDOLPH MARDIAN, OF DETROIT, MICHIGAN.

VEHICLE-AXLE.

SPECIFICATION forming part of Letters Patent No. 704,327, dated July 8, 1902.

Application filed February 18, 1902. Serial No. 94,661. (No model.)

*To all whom it may concern:*

Be it known that I, GUSTAV HECK, a citizen of the United States, residing at Detroit, in the county of Wayne and State of Michigan, have invented certain new and useful Improvements in Vehicle-Axles, of which the following is a specification, reference being had therein to the accompanying drawings.

The invention relates generally to vehicle-axles, and particularly to a self-oiling axle; and the invention consists in the novel construction of an axle of this type and in the peculiar arrangement and combination of its various parts, as will be hereinafter more fully described.

In the drawings illustrating my invention, Figure 1 is a vertical central section through the vehicle-axle and its parts; and Fig. 2 is a section on line $y\, y$, Fig. 1.

In the drawings thus briefly described the reference-letter A designates the axle proper, provided with the usual spindle B, which carries the usual threaded reduced portion C at its end.

D designates the skein or box, which is revolubly mounted upon the spindle, and F is a nut threaded on the spindle end. Upon the outer end of the skein is arranged an oil-receptacle G, which embraces the spindle end. This receptacle is formed by a cylindrical casing H, having at its inner end a threaded portion I, which engages a thread J upon the skein end.

K designates an oil-retaining cap for the casing, which completes the receptacle. The cap, as shown, is provided with an annular threaded flange L, adapted to engage an internal thread M upon the outer portion of the casing.

Oil from the receptacle described is fed to the spindle through the agency of an aperture $a$, formed in the nut F, the aperture being adapted when the nut is clamped in place to lead from the receptacle or reservoir to a longitudinal groove $b$, formed in the top of the spindle. By this construction a suitable supply of oil is fed automatically to the spindle and a necessary amount of lubrication is afforded the parts. I have also provided an annular oil-chamber O at the inner end of the skein for the purpose of supplying oil to the inner end of the spindle. This chamber is formed by means of two cylindrical casings P and Q and an annular flange R, as plainly shown. The casing Q, which carries the flange referred to, has a threaded portion S, which engages a thread T, formed upon the axle in proximity to the spindle, the casing extending inwardly over the axle and spaced from the latter, as shown. The outer casing P has a threaded section U, which engages an external thread V upon the skein. This casing projects inwardly over the annular flange R and beyond the latter, as indicated.

For the purpose of forming a tight joint between the two casings to retain the oil within the chamber I provide a packing W, which is arranged between the two casings inwardly of the flange R, and an annular cap X, the periphery of which is threaded to engage an internal thread $c$ upon the casing P. This cap, as shown, is preferably provided with an annular groove Y, within which the extreme end portion Z of the casing Q extends. Thus by screwing in the cap X the packing is compressed and the cap itself is brought tightly into contact with the edge of the inner casing Q, thus effectively preventing the discharge of the oil beyond the annular flange R.

For the purpose of allowing the oil within the chamber described to be fed to the axle-spindle a space $d$ is formed between the inner end of the skein and the inner casing Q and between the skein and the spindle, as at $e$. A space $f$ is also formed between the shoulder $g$ upon the interior of the skein and the outer end of the casing Q, within which the usual washer $h$ is arranged. The spaces $d$, $e$, and $f$ form in connection with each other an oil-duct leading from the oil-chamber O to the inward portion of the spindle and which enables the spindle at its inner end to be suitably lubricated.

Both the oil-receptacle G and the chamber O are provided with oil-inlet ports, such as $i$. These ports in turn are provided with tap-bolts $j$, preventing the discharge of the oil.

What I claim as my invention is—

1. In a vehicle-axle, the combination with the axle proper, of its spindle, the skein revolubly mounted upon the spindle, two concentrically-arranged and inwardly-extending casings spaced from each other forming therebetween an oil-chamber and carried respectively by the axle and skein, there being an oil-duct leading from said chamber to the spindle, and an annular flange upon one of said casings extending outward and bearing against the other.

2. In a vehicle-axle, the combination with the axle proper, of its spindle, the skein revolubly mounted upon the spindle, two concentrically-arranged and inwardly-extending casings spaced from each other forming therebetween an oil-chamber and threaded respectively upon the axle and skein, there being an oil-duct leading from said chamber to the spindle, and an annular flange integral with the inner casing and projecting outward and having a bearing against said outer casing.

3. In a vehicle-axle, the combination with the axle proper, of its spindle, the skein revolubly mounted upon the spindle, two concentrically-arranged and inwardly-extending casings spaced from each other and carried respectively by the axle and skein, an annular flange upon the inner casing projecting toward and bearing against the outer casing, a packing arranged intermediate of the casings and inwardly of the flange, and a packing-retaining cap engaging both casings.

In testimony whereof I affix my signature in presence of two witnesses.

GUSTAV HECK.

Witnesses:
L. J. WHITTEMORE,
H. C. SMITH.